United States Patent
Hommema

(10) Patent No.: US 7,114,336 B2
(45) Date of Patent: Oct. 3, 2006

(54) FLOW PULSING VALVE AND FUEL SUPPLY SYSTEM FOR A TURBINE ENGINE INCORPORATING SAME

(75) Inventor: Edward L. Hommema, Rockford, IL (US)

(73) Assignee: Woodward Governor Company, Rockford, IL (US)

( * ) Notice: Subject to any disclaimer, the term of this patent is extended or adjusted under 35 U.S.C. 154(b) by 151 days.

(21) Appl. No.: 10/769,009

(22) Filed: Jan. 30, 2004

(65) Prior Publication Data

US 2005/0166573 A1 Aug. 4, 2005

(51) Int. Cl.
*F02C 7/22* (2006.01)
(52) U.S. Cl. ................... 60/734; 137/625.28
(58) Field of Classification Search ............ 60/734; 137/599.01, 599.11, 601.16, 625.28, 625.29, 137/625.31
See application file for complete search history.

(56) References Cited

U.S. PATENT DOCUMENTS 3,568,716 A * 3/1971 Heitzman ............ 137/624.14
2003/0056490 A1* 3/2003 Anderson et al. ........ 60/39.281

OTHER PUBLICATIONS

C.E. Johnson et al., AIAA 2000-0476 Suppression of Combustion Instabilities in a Liquid Fuel Combustor Using a Fast Adaptive Control Algorithm, 38th Aerospace Scienses Meeting & Exhibit, Jan. 10-13, 2000, Reno, Nevada, 10 pages.

Y. Neumeier et al., AIAA 98-3540 Liquid Injector Actuator for Control of Combustion Processes, 34th AIAA/ASME/SAE/ASEE Joint Propulsion Conference & Exhibit, Jul. 13-15, 1998, Cleveland, Ohio, 20 pages.

Prabir Barooah et al., GT-2002-30042 Active Combustion Instability Control with Spinning Valve Actuator, Proceedings of ASME Turbo expo 2002, Jun. 3-6, 2002, Amsterdam, The Netherlands, 11 pages.

C.Hantschk et al., Active Instability Control With Direct-Drive Servo Valves in Liquid-Fueled Combustion Systems, Twenty-Sixth Symposium (International) on Combustion/The Combustion Institute, 1996, pp. 2835-2841.

Textron Motion Control, Hydraulic R-DDV™ servovalves, at http://www.textronmotioncontrol.com/Pages/motioncontrol02.html, last visited Jul. 27, 2001.

* cited by examiner

*Primary Examiner*—Louis J. Casaregola
(74) *Attorney, Agent, or Firm*—Reinhart Boerner Van Deuren P.C.

(57) ABSTRACT

A pulsing valve assembly pulses metered fuel flow to a turbine engine. The pulsing valve assembly comprises a valve housing having an inlet and an outlet. A divider valve divides metered fuel flow into a first flow portion and a second flow portion. A first actuator sets a magnitude of a flow divide between the first and second flow portions. The valve assembly also includes a pulsing valve for pulsing the first flow portion and a second actuator for setting a frequency of pulsing valve. The pulsed and unpulsed flow portions are then joined and delivered to the turbine engine combustion chamber.

26 Claims, 8 Drawing Sheets

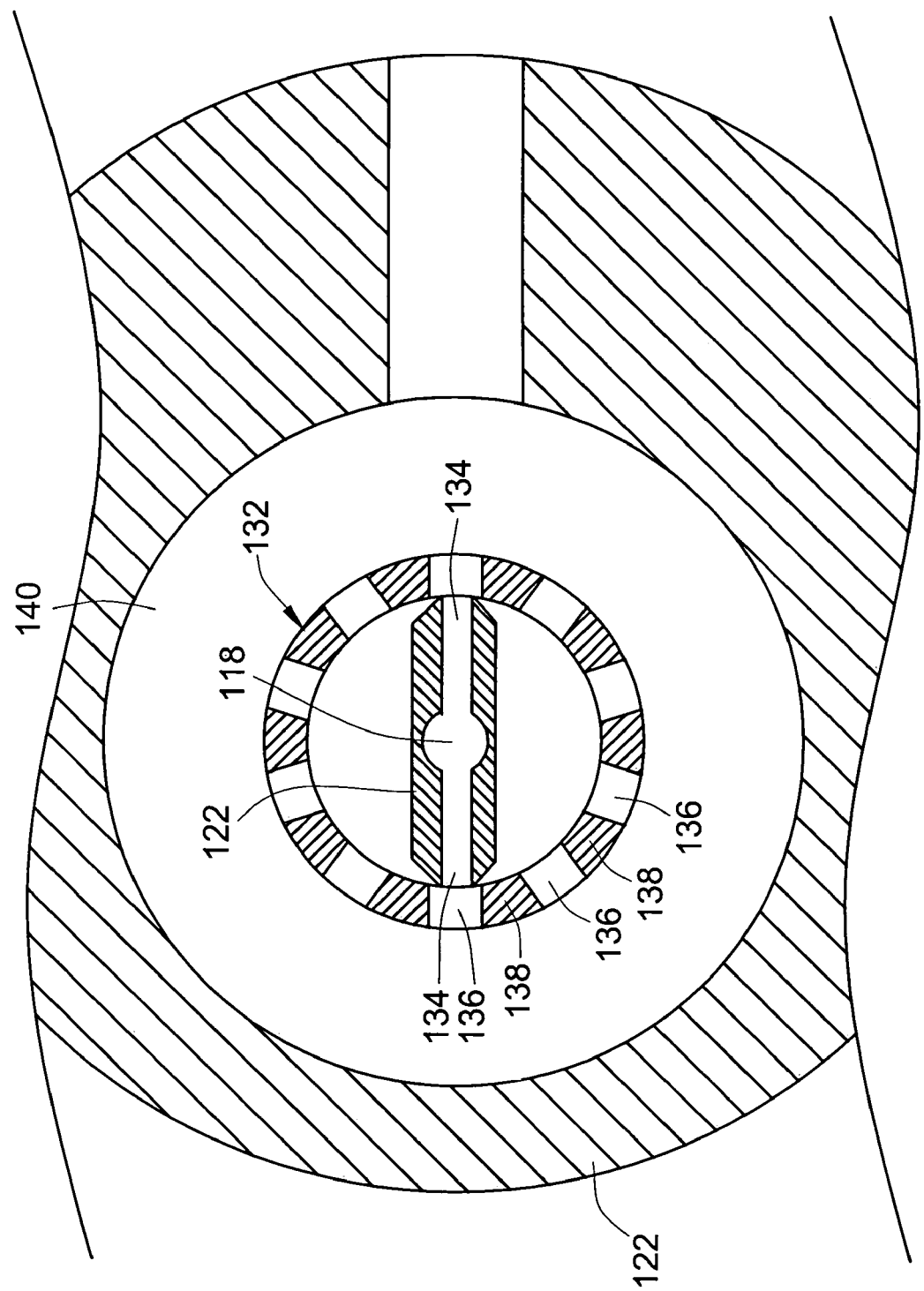

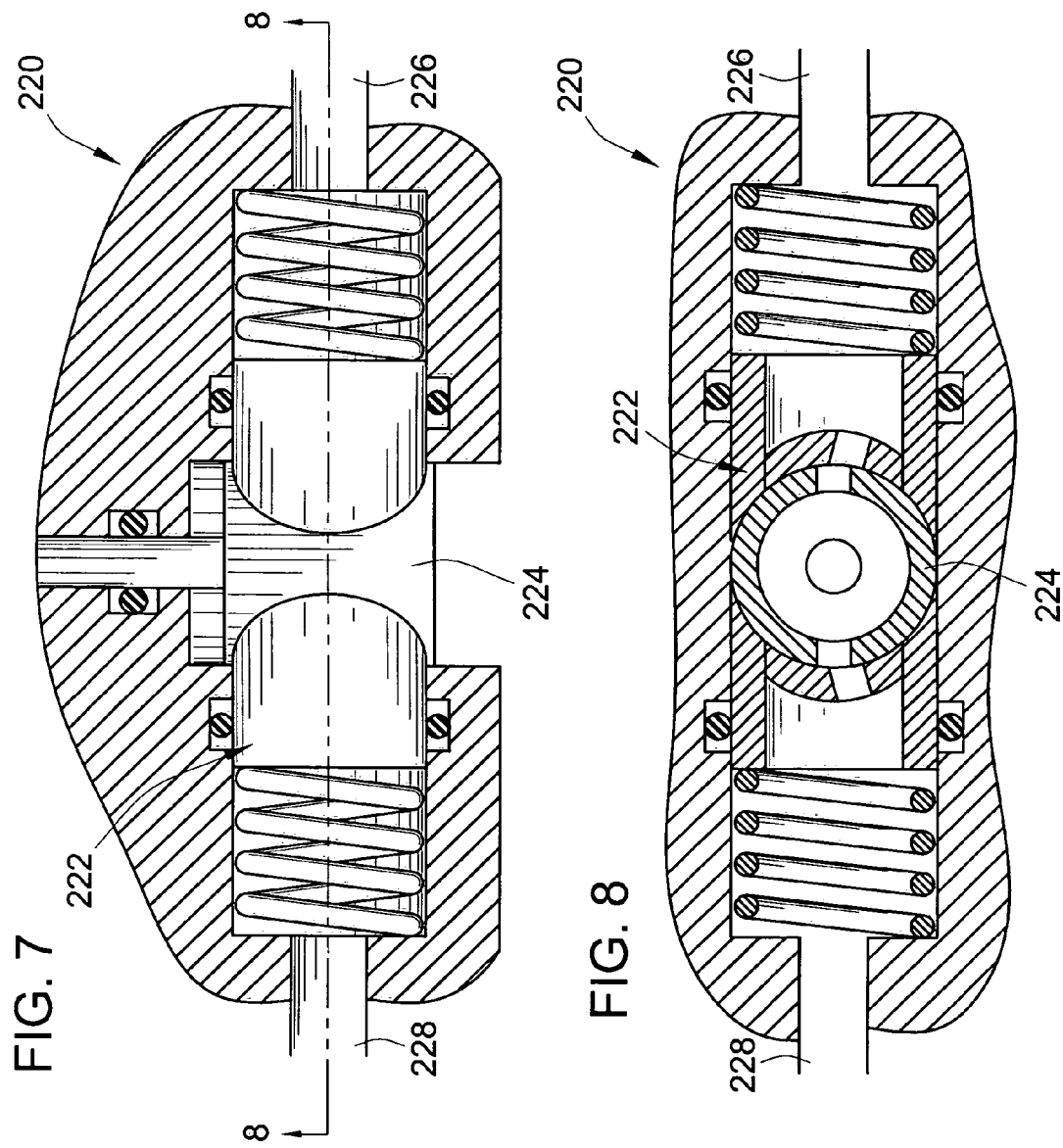

FLOW PULSING VALVE AND FUEL SUPPLY SYSTEM FOR A TURBINE ENGINE INCORPORATING SAME

FIELD OF THE INVENTION

The present invention generally relates to flow control valves, and more particularly relates to flow pulsing valves and/or applications of such valves in turbine engine fuel supply systems.

BACKGROUND OF THE INVENTION

Combustion instabilities frequently are encountered during the development and use of modern industrial gas turbine engines, especially engines that have low $NO_x$ technology. These low pollution engines operate at fuel mixtures that can result in combustor instabilities at frequencies up to 700 Hz or even higher. The pressure oscillation caused by the instability can damage the combustor. Often, during engine development, the combustor geometry is modified to correct these instabilities. These modifications are called passive techniques and are generally effective for a limited range of operating conditions. Recently, active control methods have been successfully tested in a laboratory environment. Active control means that some engine parameter, such as engine geometry or fuel flow, is varied at the combustion oscillation frequency but out-of-phase with the instability to dampen the oscillations. A key advantage of the active control system may be the ability to dampen oscillations over a much wider range of engine operating conditions and fuels.

Some active control systems tested to date have used high-speed actuators and valves to pulse fuel flow. For example, magnetostrictive or piezoelectric actuators or high-speed electrohydraulic servo-valves have been used. These valves have proven the theory of active control. However, the technology has not been suitable for commercial production applications. This proposed technology to date is expensive, has performance limitations due to very low stroke, and has limited life.

The state of the art as described above is more fully discussed in the following technical papers and patent application which are hereby incorporated by reference in their entireties: *Liquid Injector Actuator for Control of Combustion Processes*, AIAA 98-3540, Y. Neumeier, E. Lubarsky, R. Heising, O. Israeli, M. Neumaier and B. T. Zinn, Georgia Institute of Technology, 34th AIAA/ASME/SAE/ASEE Joint Propulsion Conference & Exhibit, July 13–15, 1998; *Suppression of Combustion Instabilities in a Liquid Fuel Combustor Using a Fast Adaptive Control Algorithm*, AIAA 2000-0476, C. E. Johnson, Y. Neumeier, E. Lubarsky, J. Y. Lee, M. Neumaier and B. T. Zinn, Georgia Institute of Technology, AIAA 38th Aerospace Sciences Meeting & Exhibit, 10–13 Jan. 2000; *Active Instability Control With Direct-Drive Servo Valves In Liquid-Fueled Combustion Systems*, C. Hantschk, J. Hermann and D. Vortmeyer, 26th Symposium (International) on Combustion/ The Combustion Institute, 1996/pp. 2835–2841; *Active Combustion Instability Control With Spinning Valve Actuator*, GT-2002-30042, P. Barooah, T. Anderson and J. Cohen, ASME Turbo Expo 2002, Jun. 3–6, 2002, © 2002 by ASME; *Hydraulic R-DDV™ Servovalves*, www.textronmotioncontrol.com, Jul. 27, 2001; U.S. Patent Publication No. US 2003/0056490 A1, Anderson et al., VALVE ASSEMBLY FOR USE IN A GAS FUEL NOZZLE, application Ser. No. 09/965,217, Filed Sep. 27, 2001. None of these references have provided a suitable solution for commercial production due to one or more of the following issues: cost, performance limitations, reliability, lifespan concerns, and/or other such concerns. Accordingly, there is a desire for technology that may be employed not just in the laboratory but in commercial applications.

BRIEF SUMMARY OF THE INVENTION

One aspect of the present invention is directed toward a valve assembly for pulsing fluid flow that divides the flow into first and second flow paths and then pulses the flow along the first flow path and then which rejoins the two flows to provide a combined flow that includes a pulsed component. The valve assembly may include a valve housing having an inlet and an outlet. First and second flow paths are fluidically between the inlet and the outlet. A divider valve is arranged to divide fluid flow from the inlet port among the two different flow paths. A pulsing valve is arranged along the first flow path downstream of the divider valve. The pulsing valve is moveable to successively interrupt flow through the first flow path and thereby pulse the fluid along the first flow path. The two flow paths join one another for communication to a desired application such as the combustion chamber of a turbine engine.

It is a further aspect of this invention that the divider valve may serve to set the magnitude of the flow between the two flow paths such that the magnitude or size of the pulses can be controlled. It is an advantage that the divider valve can be positioned with a less costly and smaller actuator since rapid response or high force is not needed. It is an even further aspect of the invention that the pulsing valve may include a rotary sleeve which can be rotated at relatively low speeds in which one or more chopper ports on the sleeve is successively connected and disconnected one or more chopper ports provided around the sleeve. A large number of chopper ports can be used to cause multiple pulses to occur per one rotation of the valve (hence allowing for lower rotational speed).

Another aspect of the present invention is directed toward the valve assembly for pulsing a metered fuel flow to a turbine engine. The valve assembly comprises a valve housing having an inlet and an outlet and means for dividing metered fuel flow into a first flow portion and a second flow portion. A first actuator sets a magnitude of a flow divide between the first and second flow portions. The valve assembly also includes a means for pulsing the first flow portion and the second actuator for setting a frequency of pulsing means. Passageway means is provided by combining the first and second flow portions for communication to the outlet.

A further aspect of the present invention is directed toward a fuel supply system for a turbine engine comprising a fuel pump adapted to pump fuel toward a turbine engine and a fuel metering unit in fluid series with the fuel pump to provide a metered flow of fuel. Means is provided downstream of the fuel metering unit for dividing the metered flow into first and second fuel flows (e.g. one or more restrictions) along separate passageways and for pulsing the first flow (e.g. chopper ports). A collection passageway is provided downstream of the dividing and pulsing means for combining the first and second fuel flows and passing the combined flow to a combustor of the turbine engine for combustion.

It is an advantage of a preferred embodiment that the fuel supply system may comprise a single fuel metering valve dedicated to both flow paths of each pulsing valve assembly (meaning that two or more separate fuel metering units are not needed for separate flow paths and there may be multiple fuel metering valves and multiple corresponding pulsing valve assemblies for larger turbine engines) and therefore separate metering valves for the first and second flow paths and/or high-speed actuators for setting a desired pulse magnitude are not necessary. This simplifies engine control as only one valve controls the total fuel flow to the engine.

Finally, a further aspect of the present invention is directed toward a method of supplying fuel to a turbine engine comprising pumping and metering the fuel to provide a metered fuel flow; dividing the metered fuel flow into a first flow portion and a second flow portion; pulsing the first flow portion; and joining the first and second flow portions for delivery to the turbine engine.

Other aspects, objectives and advantages of the invention will become more apparent from the following detailed description when taken in conjunction with the accompanying drawings.

BRIEF DESCRIPTION OF THE DRAWINGS

FIG. 6 is a cross-section of FIG. 5 taken about line 6—6.

FIG. 7 is a cross-section of a further embodiment of a flow divider valve for a flow pulsing valve assembly.

FIG. 8 is a cross-section of FIG. 7 taken about line 8—8.

DETAILED DESCRIPTION OF THE INVENTION

Figure 1:
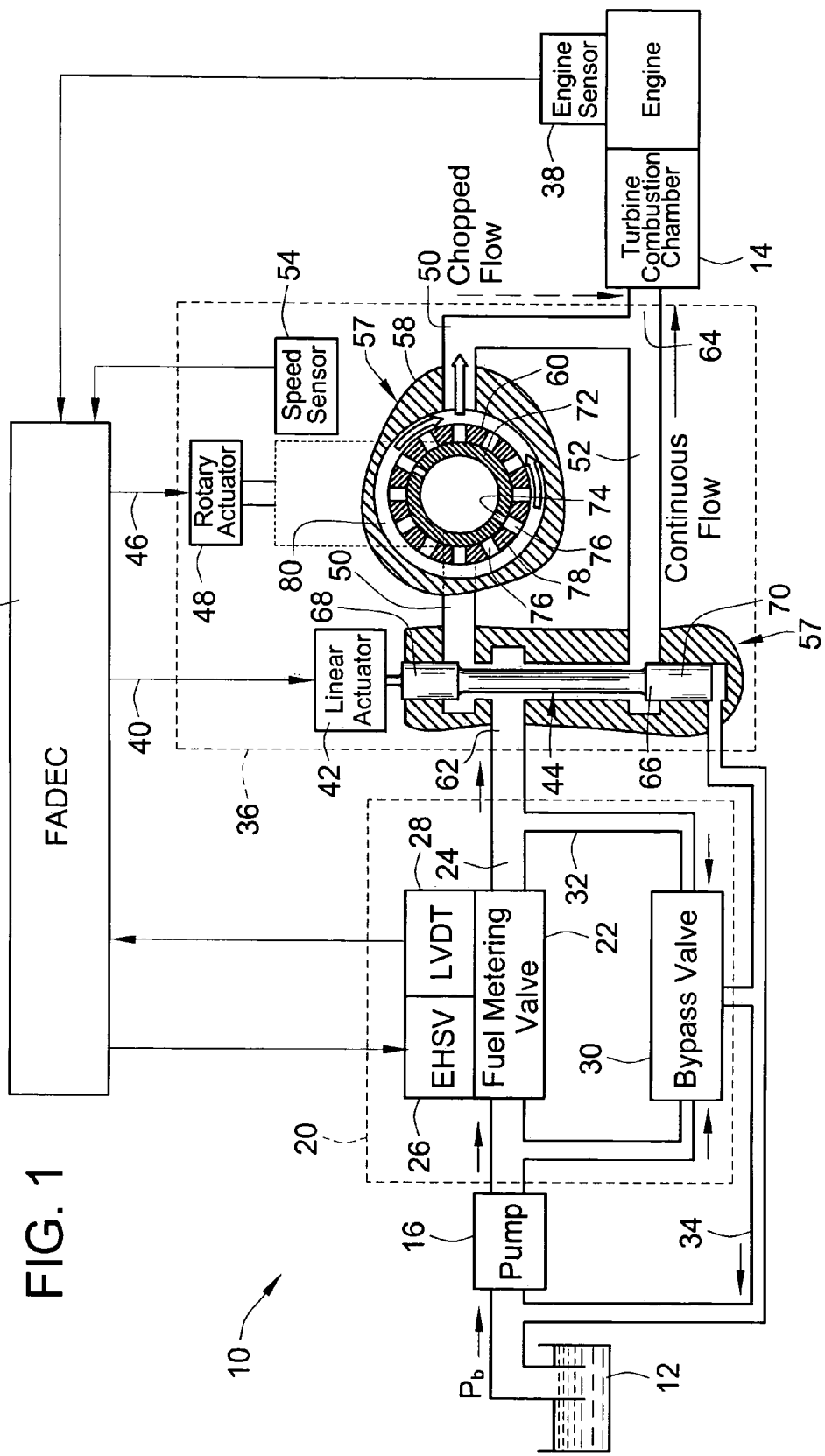
FIG. 1 is a schematic representation of a fuel supply system for a turbine engine in accordance with an embodiment of the present invention.

Referring to FIG. 1, a schematic representation of a liquid fuel supply system 10 for a turbine engine is illustrated in accordance with an embodiment of the present invention. A gas system will be slightly different. The pressure output of the pump is regulated by virtue of the compressible nature of gas rather than a bypass valve. The fuel supply system generally supplies liquid or gaseous fuel from a fuel source such as a fuel tank 12 to the turbine combustion chamber 14 where the fuel is ignited. The fuel supply system 10 may include a pump 16 arranged in series with the fuel tank 12 to pressurize and pump fuel toward the turbine combustion chamber 14.

In modern systems, an electronic controller is provided for electronically controlling the flow of fuel to the combustion chamber. Accordingly, FIG. 1 schematically illustrates an electronic controller in the form of a full authority digital electrical control or what is referred to as the FADEC 18 that electronically controls the various actuated valves of the system 10.

To control the overall flow rate, the FADEC 18 electronically controls a fuel metering unit 20. The fuel metering unit 20 is arranged in fluid series with the fuel pump 16 and includes a fuel metering valve 22 disposed along the main fuel supply passageway 24. The fuel metering valve 22 provides a restriction which is controlled in a closed loop manner by the FADEC 18 such that a predetermined fuel flow rate is established along the fuel supply passageway 24 and such that a known predetermined flow rate of fuel is provided to the turbine combustion chamber 14.

The illustrated fuel metering unit 20 includes an actuator in the form of an electro hydraulic servo valve or EHSV 26 which positions the fuel metering valve 20 in response to electrical commands from the FADEC 18. A position sensor such as a linear variable displacement transducer or LVDT 28 senses the position of the fuel metering valve and provides sensed feedback to the FADEC 18 for closed loop control over the fuel metering valve 22 as is schematically illustrated.

As the pump 16 will generate excess liquid fuel flow, the bypass valve 30 is arranged in fluid parallel with the fuel metering valve 22 to bypass excess fuel flow generated by the pump 16 along a recirculation passageway 34 back to the low pressure side ($P_b$) of the fuel pump 16 for recirculating a portion of the fuel flow back across the pump (in gaseous fuel systems a bypass is not needed since gaseous fuel is compressible). The bypass valve 30 is pressure sensitive to the downstream side of the fuel metering valve 22 and as such a pressure sensing line 32 is provided for the bypass valve 30. The pressure sensing line 32 communicates the pressure downstream of the pump 16 to the bypass valve 30. As pressure drops on the downstream side of the fuel metering valve 22 this is sensed that the bypass valve which in turn tends to cause the bypass valve to close the bypass recirculation passageway 34. Similarly, if pressure increases, this is delivered to the bypass valve by way of pressure sensing line 32 open the bypass valve 30 and thereby increase the portion which is recirculated along the recirculation passageway 34.

Various designs of fuel metering units are known and commercially employed in the industry and therefore it will be readily understood by one skilled in the art that many different designs and configurations of fuel metering units can be employed. The depicted system 10 includes the typical electronic engine controller or FADEC 18 and fuel metering valve arrangement in the fuel metering unit 20. For simplicity, in this schematic one metered supply flow passageway 24 is shown going to the engine (along with one fuel metering unit 20). However, it will be appreciated that for many large turbine engines there may be two or three metering valves for two or three combustor "stages" or sets of nozzles. There also may be flow dividers that divide each metered flow stream into multiple flow paths going to each set of nozzles. In these alternative embodiments, the pulsing valve(s) 36 (described below) can be similarly located downstream of the metering valve(s) 22. Industrial engines often have multiple combustion "cans". If there were multiple combustion cans there may be multiple pulsing valves 36, and one pulsing valve 36 may be dedicated to each can. Each different pulsing valve can be operated independently to dampen the particular oscillation in a combustor can. Pulsing valve(s) could also be used on the annular combustion chambers that are found on aircraft gas turbine engines. Therefore, it will be readily appreciated by one skilled in the art that the broader claims appended hereto are meant to include these different potential arrangements and configurations as may be determined by application size and requirements of the many different sizes and configurations of turbines that are commercially employed.

Turning in greater detail to the pulsing valve assembly 36, this valve 36 is arranged along the principal fuel supply passageway 24 and in fluid series with the fuel metering valve 22 (preferably downstream thereof but it is also possible for an upstream arrangement). It should be noted that with the fuel metering unit 20 being arranged in fluid series with the pulsing valve assembly 36, the full flow rate is already established by the fuel metering unit 20 and therefore control over fuel flow rate does not need to be done or is not a consideration as it relates to the disclosed embodiment of the pulsing valve assembly 36. Further, it should also be noted that a single fuel metering unit 20 can be dedicated for both pulsed and unpulsed flow paths 50, 52 for each pulsing valve assembly 26 used along one metered fuel circuit in the fuel supply system 10 and thus separate fuel metering units for pulsed and unpulsed flow paths 50, 52 are not necessary as will be further evident below (this can also be true for applications where there are multiple fuel metering valves, divider valves, and/or pulsing valves). In other words, a separate fuel metering valve is not needed for each different flow path through the pulsing valve assembly 36.

As shown schematically in FIG. 1, the FADEC 18 electronically controls the pulsing valve assembly 36 based upon feedback from engine sensors 38 and other such sensors that may be employed to provide an indication as to the magnitude and frequency of pressure oscillations in the turbine engine. As part of the system, as described in earlier active combustion control patents or literature set forth in the background, a fast response transducer or sensor 38 can be located in the turbine combustion chamber 14 to measure the magnitude and frequency of the combustor oscillations. The transducer could measure any of several physical parameters indicative of the combustor oscillation. For example, pressure, temperature, flame ionization, ultraviolet radiation, etc. The transducer signal is provided to an electronic controller that determines the desired fuel flow pulsation amplitude, frequency, and phase angle to dampen the oscillation.

Based on this input from the sensor 38, the FADEC 18 issues corresponding control signals to various actuators in the pulsing valve assembly 36. In particular, the FADEC issues a magnitude signal 40 which positions an actuator 42 that positions a flow divider valve 44 and a frequency demand signal 46 that controls the speed of a rotary actuator 48 that drives a rotor or rotary valve 56 which in turn facilitates fuel flow interruption and thereby pulsing of the fuel flow along one of the flow paths 50, 52 that are established by the flow divider valve 44. A speed sensor 54 may be provided to sense the speed of the rotary valve 56 that chops or interrupts the flow and thereby pulses the flow. This provides for closed loop control over the operation of the rotary valve 56 which establishes a pulsed flow along the first flow path 50. Additionally, it is also illustrated in FIG. 1 that the first and second flow paths 50, 52 are rejoined and then communicated along the primary fuel supply passageway 24 to the turbine combustion chamber 14.

Figure 2:
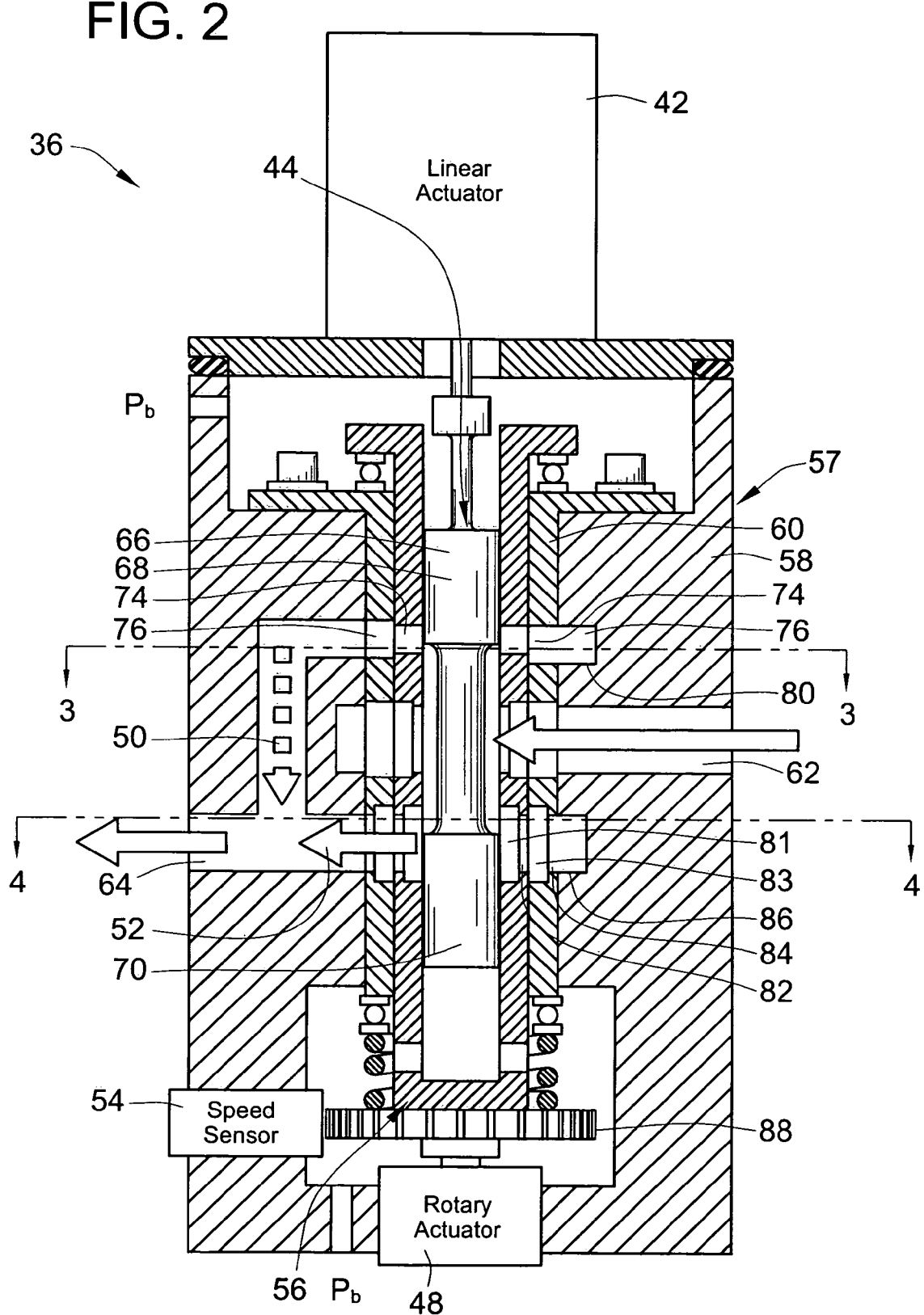
FIG. 2 is a partly schematic cross-sectional representation of a pulsing valve assembly in accordance with an embodiment of the present invention.
Figure 3:
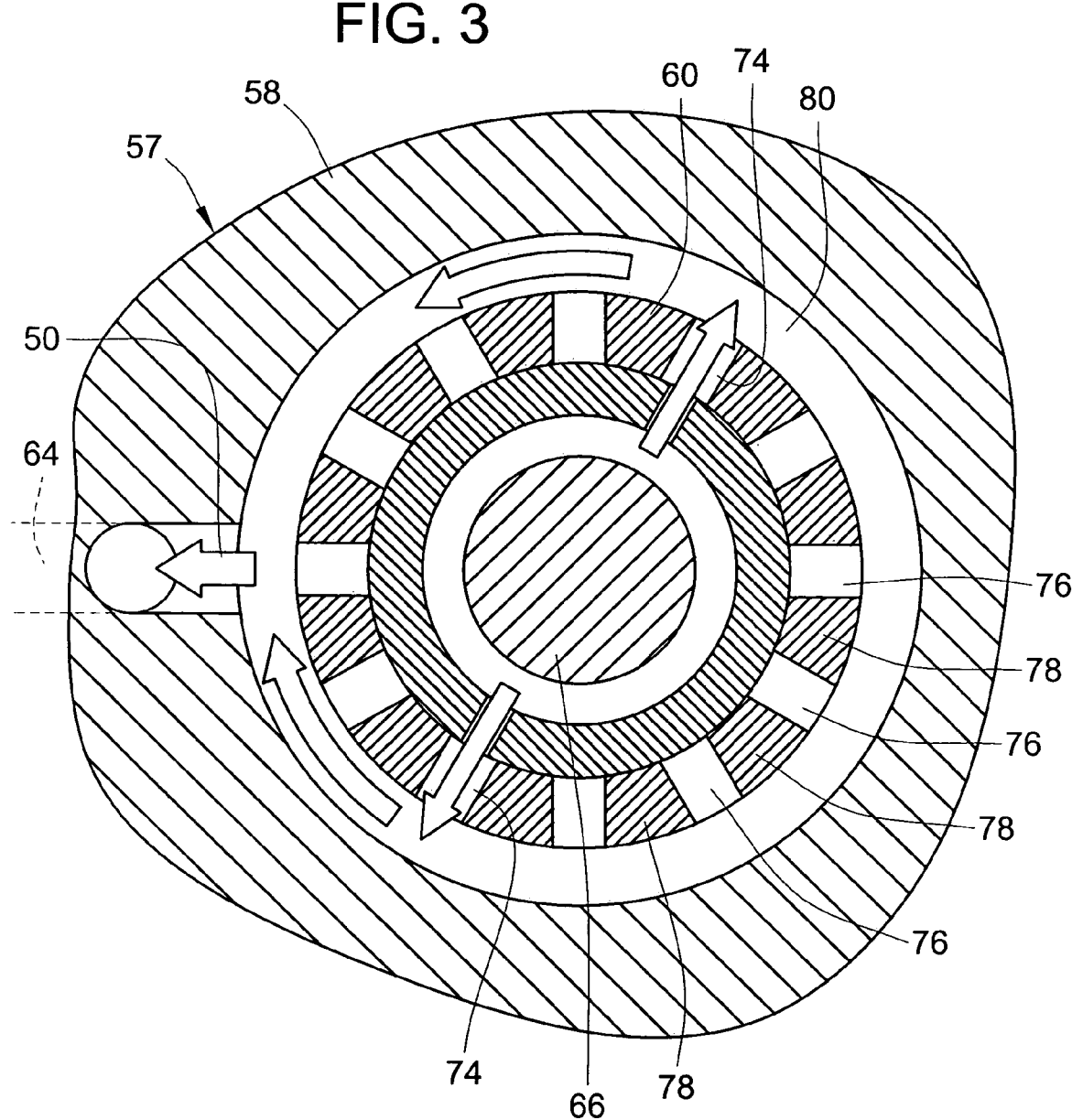
FIG. 3 is a cross-section of FIG. 2 taken about line 3—3.
Figure 4:
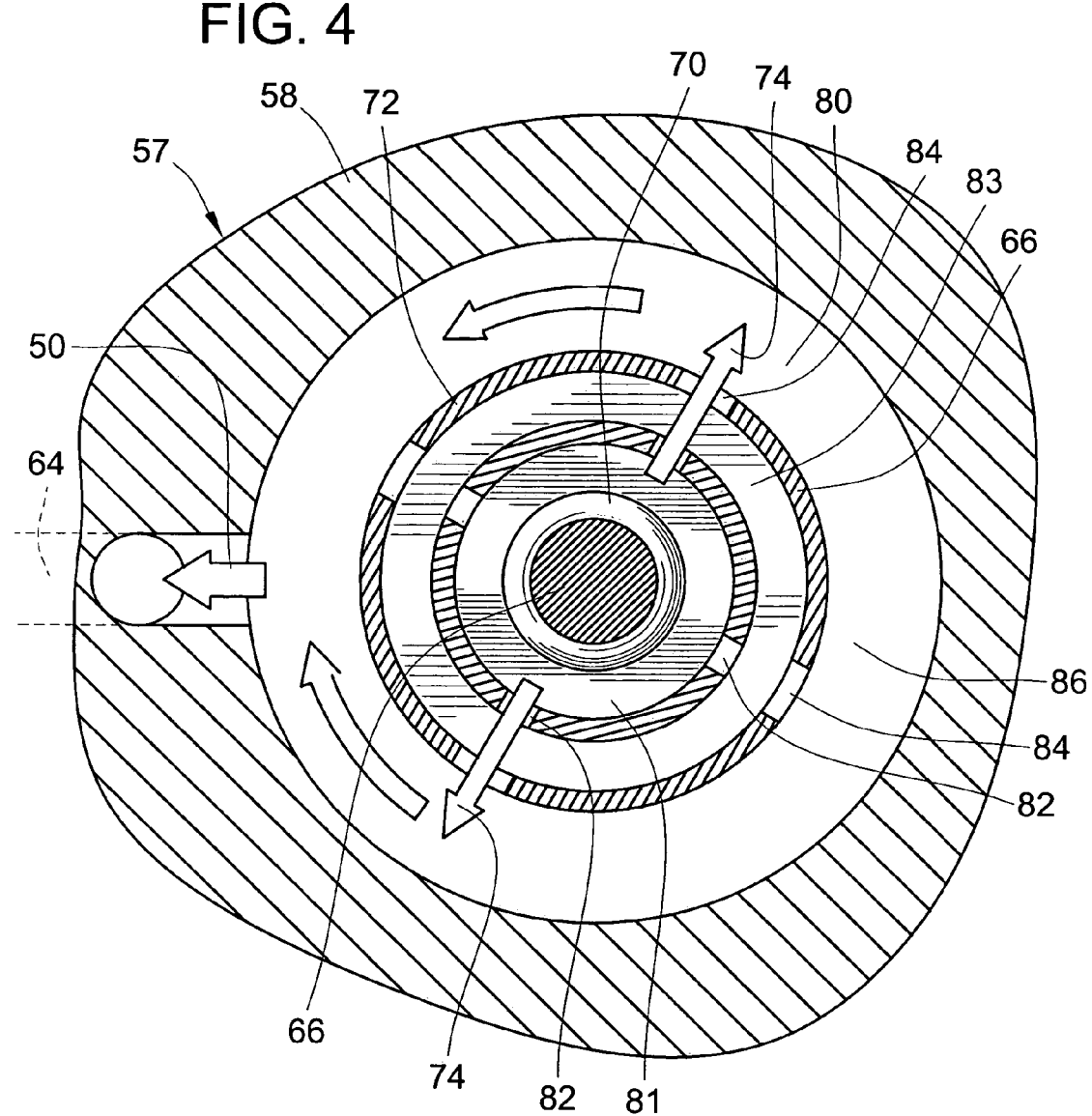
FIG. 4 is a cross-section of FIG. 2 taken about line 4—4.

With a system level understanding of the invention now provided above, attention can now be had to FIGS. 2–4 which illustrate a first embodiment of the pulsing valve assembly 36 particularly suited for liquid fuels.

Referring to FIG. 2, the pulsing valve assembly 36 includes a support housing 57 which may be comprised of several components integrally secured together which may include for example an outer valve body 58, which defines a central bore and several passageways therethrough, and an inset cylindrical support sleeve 60 which includes various ports and is mounted into the cylindrical bore of the valve body 58. The housing 57 includes an inlet port 62 which is adapted to receive a metered flow of fuel from the fuel metering unit, and an outlet port 64 which is adapted to output a pulsed fuel flow to the turbine combustion chamber. The valve housing also defines the first flow passage or path 50 for transmitting pulse flow and a second flow passage or path 52 for transmitting unpulsed flow. As illustrated in FIG. 2, these passageways or paths 50, 52 intersect and join with one another such that the flow output at the outlet port 64 (which is ultimately transmitted to the turbine combustion chamber 14—see FIG. 1), is pulsed and continuous.

Disposed between the inlet port 62 and the first and second flow paths 50, 52 is the flow divider valve 44 which is shown in the form of a spool valve 66 having first and second spaced apart control lands 68 and 70. The spool valve 66 is arranged between the inlet port 62 and the first and second flow paths 50, 52 and serves the purpose of dividing the flow among the two flow paths and thereby setting a magnitude of the pulsed flow along the first flow path 50.

The spool valve 66 includes one end that is mounted to the flow divider actuator 42 such as a proportional linear solenoid or other suitable linear type driver. Each control land 68 and 70 is arranged to provide flow orifice restrictions (restrictions between the control ends and the ports in the surrounding sleeve), and thereby serves to set the flow divide between the first and second flow paths 50, 52.

As illustrated, when the linear flow dividing actuator 42 drives the spool valve 66, it changes the flow along the first and second flow paths 50, 52 in inverse relation such that when flow along the first flow path increases, flow along the second path decreases, and similarly when flow along the second flow path 52 increases, flow along the first flow path 50 diminishes. By doing so, the magnitude of the pulsing which occurs along the first flow path 50 can be varied from unpulsed upward in magnitude (e.g. the first flow path is closed by the first control land 68 to any appropriate magnitude of flow pulsing). It is an advantage that the flow dividing actuator can be of low speed in order to set the magnitude of each individual flow pulse but instead can be adjusted as necessary to adapt the magnitude of the flow pulsing as it is deemed necessary by the FADEC 18.

The rotary pulsing valve 56 is arranged downstream of the flow divider valve 44 and in this case is provided by a rotating sleeve having one or more chopper ports 74 as more fully seen in FIG. 3. Preferably, two chopper ports 74 (or more) are provided in equal distant angular spaced orientation about the central axis to balance pressure across the assembly. The rotary sleeve 72 is journaled with bearings for rotation between the outer stationary housing sleeve 60 and the spool valve 66. The frequency setting rotary actuator 48 is mounted to one end of the rotary sleeve 72 and serves to continuously rotate the sleeve 72 in one direction during operation. The rotary actuator 48 can either be an electric motor, or a fluid driven actuator such as a rotary turbine which might be driven by pressurized fuel in the system, or other appropriate form of rotary actuator.

In either event, the rotary speed set by the rotary actuator 48 and imparted on the rotating sleeve determines the frequency of flow interruptions along the first flow path 50. Referring to FIG. 3, the outer housing sleeve includes a plurality of corresponding chopper ports 76 with solid port blockage portions 78 therebetween which correspondingly open and close flow from the inlet port along the first flow path 50 as the rotary pulsing valve 56 rotates. By providing a large number of chopper ports 76 at equal distant angular spacing around the axis, the flow is thereby pulsed multiple times over one rotation of the valve. It is an advantage of this aspect that a much lower speed may be used by the rotary actuator 48 while setting a much higher frequency for the pulsed flow than the rotational speed of the actuator. With twelve chopper ports 76 being illustrated, flow is successively interrupted twelve times for each complete rotation of the rotating sleeve 72 of the rotary pulsing valve 56. The outer valve body includes a flow collection annulus 80 that collects all of the flow being transmitted through the chopper ports 74, 76 for communication along the first flow path 50 where it subsequently intersects the second flow path and is rejoined and transmitted through the outlet port 64 to the turbine combustion chamber 14.

The frequency of the flow pulsations produced by the valve is dependent on the valve rotational speed and the number of chopper ports. For example, at a rotational speed of 1000 RPM with 12 ports shown, the valve will produce a pulse frequency of 200 Hz. (e.g. 1000 RPM/60)*12=200 Hz). The number of chopper ports and speed range of the rotary actuator can therefore be selected to provide for anticipated pulse frequency range that will be encountered in a fuel metering application.

Although successive interruption of flow occurs along the first flow path, no such interruption preferably occurs along the second flow path 52 by virtue of continuous flow 360° porting as indicated in FIG. 4. Thus, a continuous and non-pulsed flow is generated along the second flow path 52 in the illustrated embodiment regardless of the speed of the rotary pulsing valve 56 (It will understood that a similar 360° porting arrangement exists also for the ports allowing for continuous introduction of fuel flow into the central chamber of the sleeve between control lands 68 and 70 from the inlet port 62).

Referring to FIG. 4, the ports 82 of the rotary sleeve are in communication with the through ports 84 in the housing sleeve 60 by virtue of an annular collection groove 83 therebetween (an annular collection groove 81 may also surround the spool valve) such that the second flow path remains open regardless of the relative angular orientation between the two sleeves 72, 60. It should be noted that the sizing of the ports 82, 84 are such so as not to interfere with flow or provide a restriction that is smaller than what may be provided by the second control land 70 and the port sizes are generous enough so as not to affect or interrupt flow along the second flow path. A collection annulus 86 is similarly provided in the outer valve body 58 for collecting the flow and transmitting it to and along the second flow path.

The speed of the rotary pulsing valve 56 is sensed by the speed sensor 54 which in this case is a magnetic pickup sensor that senses a tooth wheel 88 which is integrally attached to the rotary pulsing valve 56. This speed sensor 54 provides sensed speed information feedback to the FADEC 18 for closed loop control if desired.

Figure 5:
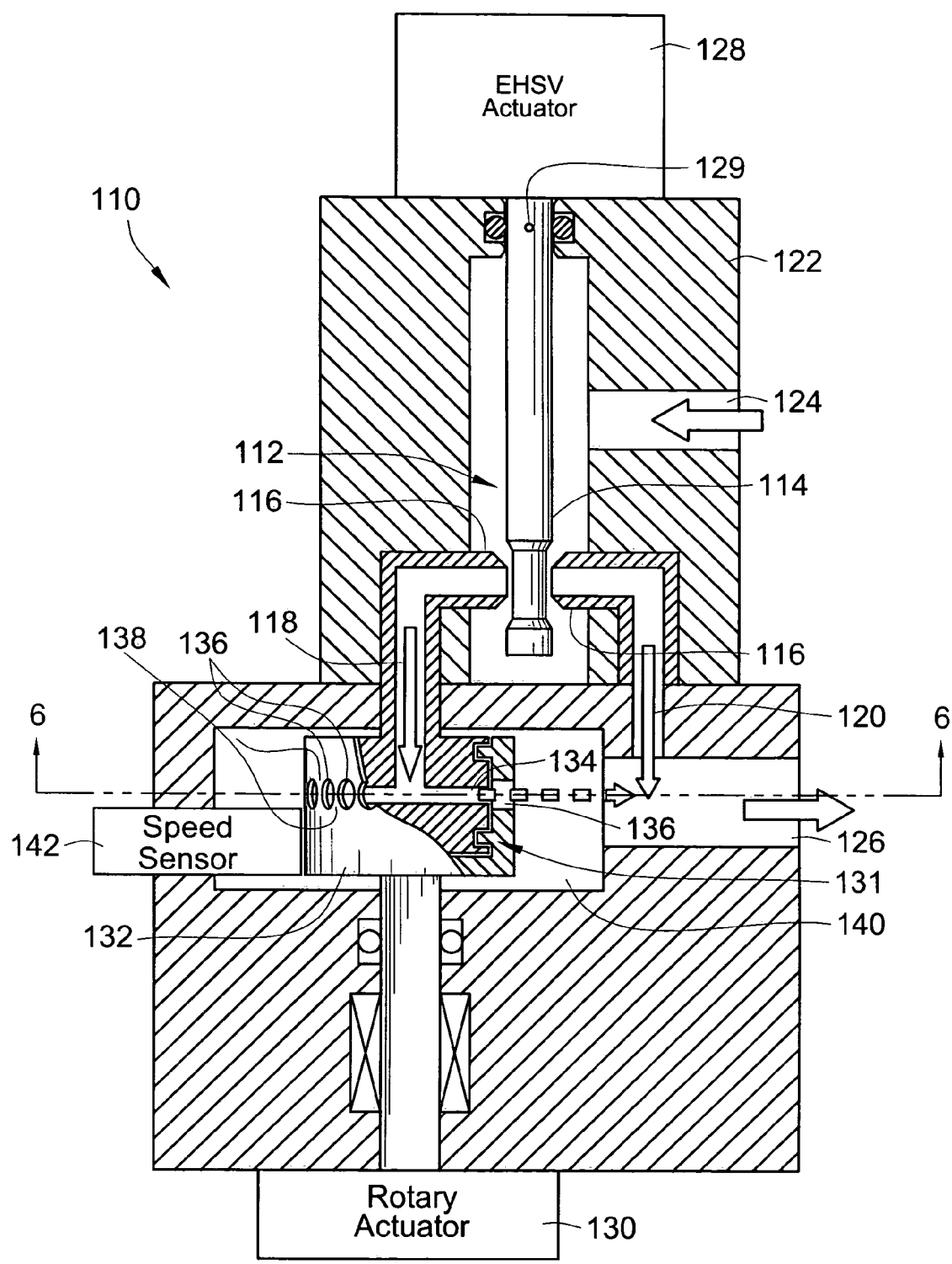
FIG. 5 is a partly schematic cross-sectional view of a pulsing valve assembly in accordance with another embodiment of the present invention.

Another embodiment of a flow pulsing valve assembly 110 is illustrated in FIGS. 5–6. this embodiment may be used for gaseous or liquid fuels. Since a fair amount of description has already been provided about the operation and advantages above, only a short description will be provided herein since it will be understood by one skilled in the art that the present embodiment operates in a substantially similar fashion to the previously discussed embodiments. However, what is important about the illustrations of FIGS. 5–7 is it shows that the present invention can be incorporated into several different types of configurations and arrangements with different types of shapes of valves being used to accomplish the division of metered flow into two flow paths and then the pulsing of flow along at least one of those flow paths.

Referring to FIG. 5, the flow pulsing valve assembly includes a nozzle/flapper type flow division valve 112 in which the position of a flapper 114 relative to two spaced nozzles 116 sets the flow divide along the first and second flow passageways 118 and 120 which provide different distinct paths for fuel through various structural components which make up a valve housing 122. As illustrated, movement of the flapper 112 causes the flow along the first and second flow passageways 118 and 120 to change an inverse relation to one another. The valve housing 122 includes an inlet port to receive metered flow from the fuel metering unit and an outlet port 126 to communicate pulsed flow to the turbine engine.

The flow dividing flapper 114 is positioned by actuator 128 such as a limited angle torquer (LAT), an electro hydraulic servo valve (EHSV) actuator or other appropriate actuator that sets a demanded angular position about flapper pivot point 129.

The second rotary actuator 130 is also provided for rotating a valve rotor in the form of a rotary drum 132. However, this second rotary actuator 130 is of the continuous rotating type. In either event, the valve housing 122 provides chopper ports 134 which successively pass in front of corresponding chopper ports 136 and port blockage portions 138 provided between adjacent chopper ports on the sleeve portion of the rotary drum 132. Fluid communicated through chopper ports 134 and 136 is received in a collection chamber 140 and rejoined with flow passing along a second flow passageway 120 to the outlet port 126. A labyrinth seal 131 may be used in this configuration to prevent and minimize fluid leakage.

Similar to the first embodiment, the magnitude of the pulsing can be changed with a relatively slow moving rotary actuator and can be held constant without motion of the rotary actuator 128. The other rotary actuator 130 is continuously spinning and its speed can be adjusted as needed to adjust the frequency of pulses in the fuel flow. The speed sensor 142 may be provided for the rotary actuator 130 if closed loop control over the rotary actuator 130 is needed.

FIGS. 7 and 8 illustrate a further possibility for accomplishing low division, in which a flow divider valve 220 comprises a shoe 222 and a rotor 224 that rotates relative to the shoe 222 to provide a flow divide between two passageways 226, 228, which can port flow to the rotary pulsing valve (as shown in previous embodiments) or bypassing the rotary or spinning flow pulsing valve. Various different types of actuators may be used to rotate the rotor 224 relative to the shoe 222 to change the flow split among flow passages 226, 228.

Referring back to FIG. 1, a couple additional advantages and comments will be made to address commercial considerations and potential advantages of the present invention. In both embodiments, and unlike many other valves that have been used to produce high frequency flow pulses as set forth in some of the literature indicated in the background section; the disclosed system 10 does not require high-speed actuators. The algorithm for setting flow magnitude and phase angle involves a mathematical routine to slowly adjust phase and magnitude of the flow pulses while monitoring the engine transducer sensor 38. The average flow rate to the turbine engine is not significantly affected as the flow pulsing valve assembly 36 (either the flow divider valve 44 or the rotary pulsing valve 56) is adjusted. Since the average metered flow does not change, the flow pulsing valve is not part of the engine speed control loop. There may be some leakage of metered flow past the two ends of the plunger to Pb pressure (pump inlet pressure) as indicated. However, this leakage is predictable depending on fuel pressure and can be compensated for, if necessary, by the engine control.

The addition of the flow pulsing valve therefore has little impact on the fuel metering system accuracy or the engine speed control loop.

Still referring to FIG. 1, in liquid applications the fuel forms a hydrodynamic bearing between the rotating parts preventing metal to metal contact, wear, or valve seizure. The high viscosity of liquid fuels also effectively limits the amount of leakage past the clearances between the sleeves and spool into the two Pb cavities (pump inlet side pressure) on the ends of the valve. Low leakage maintains the accuracy of the fuel metering system. Small amounts of leakage between the chopper ports and the 360 degree ports is not a concern as this leakage does not affect metered flow as this flow advances along the fuel supply passageway 24 and is thereby still delivered to the engine.

Figure 9:
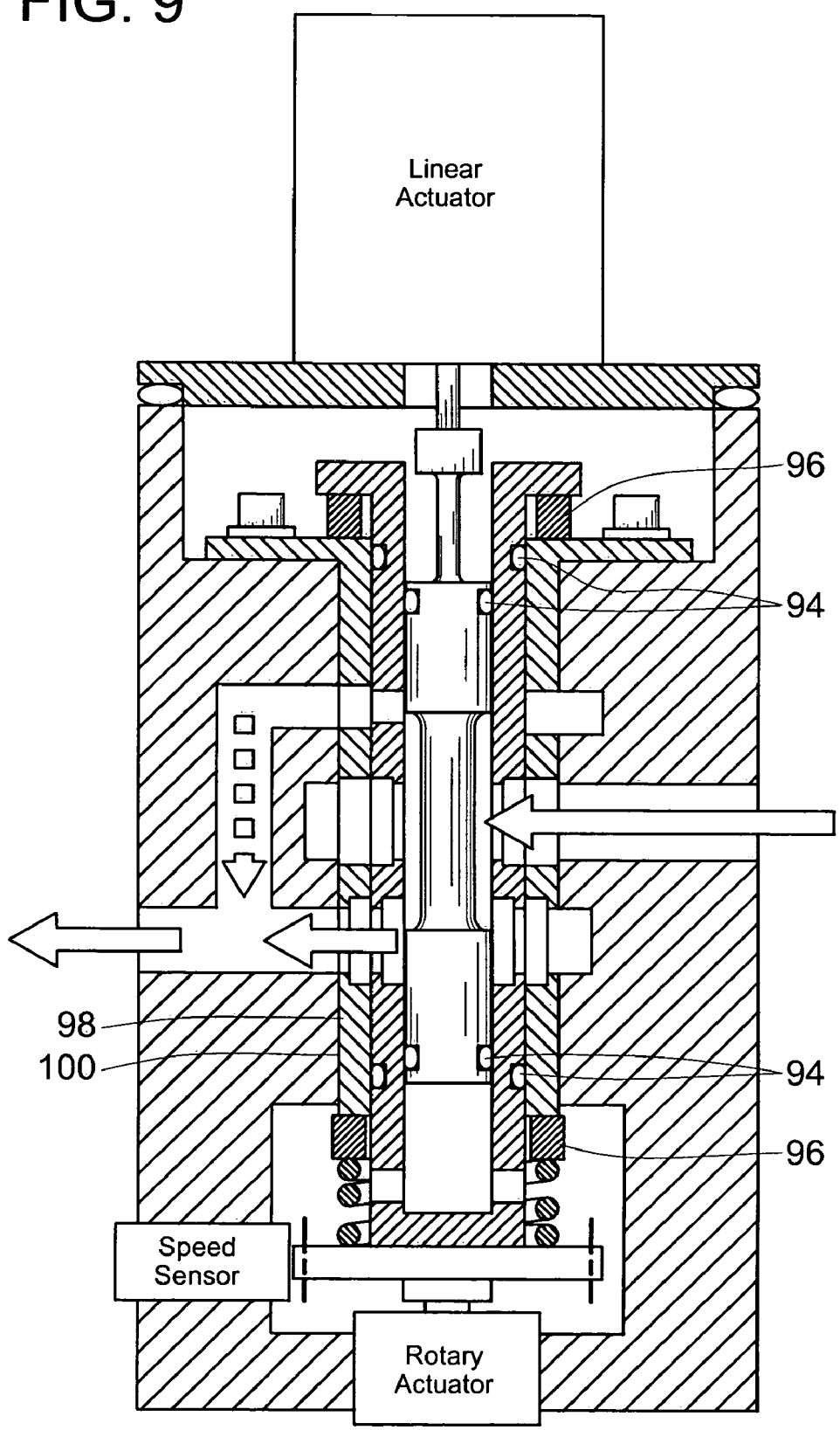
FIG. 9 is a depiction of a pulsing valve assembly similar to FIG. 2, but with modifications for accommodating gaseous fuel.

For gaseous fuels, which have low viscosity and lubricity, FIG. 9 is provided to show that the flow pulsing valve illustrated in FIG. 2 may benefit from additional design features (for purposes of brevity, a description will be provided only for identification of the design features). For example, dynamic seals 94 of various types and manufacturers may be added as shown in FIG. 8. Other modifications that could be employed in the valve include coatings with anti-galling capabilities utilizing known techniques to prevent valve seizure. Ball bearings (illustrated but not referenced in FIG. 1) may also be replaced with carbon bearings 96. (The fixed outer sleeve 98 could also have an interference fit (e.g. cool the sleeve to subzero temperature and heat the housing to 200 degrees F. and quickly install) in the outer valve body bore 100 to eliminate leakage into the Pb cavities at each end. This may be done for liquid valve as well.)

For engine operating conditions where there is no combustor instability, the pulsing valve assembly 36 will easily provide flow without any pulsations. Thus, the magnitude or first flow path can be closed completely in the absence of instability. The valve will also provide acceptable failure consequences for the two most likely failures:

1. The valve can be designed so loss of current to the linearly actuated proportional solenoid would move the spool valve to the "no pulsing" position. The affect on the engine would be loss of combustor instability damping; and
2. Loss of valve rotation would result in loss of damping (but the second flow path still stays open due to 360 degree porting arrangement).

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A valve assembly for pulsing fluid flow, comprising:
    a valve housing having an inlet, an outlet, a first flow path, and a second flow path, the first and second flow paths fluidically between the inlet and the outlet;
    a divider valve arranged to divide fluid flow from the inlet port among the first and second flow paths; and
    a pulsing valve along the first flow path downstream of the divider valve, the pulsing valve being movable to successively interrupt flow through the first flow path and thereby pulse fluid flow along the first flow path.

2. The valve assembly of claim 1, wherein the divider valve provides a first restriction along the first flow path and a second restriction along the second flow path, movement of the divider valve varying the size of the restrictions in inverse relation.

3. The valve assembly of claim 2, further comprising an actuator acting on the divider valve, the actuator adapted to drive the divider valve to control sizes of the first and second restrictions.

4. The valve assembly of claim 1, wherein the pulsing valve includes first and second bodies, a rotary actuator acting on at least one of the bodies to facilitate relative rotation between the two bodies about an axis, the first body including at least one first chopper port and the second body including a plurality of second chopper ports spaced around the axis and separated by corresponding plurality of port blockage portions, wherein relative rotation between the two bodies causes the at least one port blockage portions and second chopper ports to successively open and close the first flow path.

5. The valve assembly of claim 4, wherein the rotary actuator is selected from the group consisting of a rotary turbine and an electric motor.

6. The valve assembly of claim 1, wherein the flow divider valve comprises a spool valve linearly movable along an axis, the spool valve including first and second cylindrical lands, the first and second lands regulating fluid flow from the inlet to the first and second flow paths, respectively, and wherein the pulsing valve comprises a sleeve mounted for rotation concentrically about the spool valve, the sleeve having at least one chopper port rotatable relative to at least one port block, rotation of the sleeve causing the at least one port block to successively open and close the at least one chopper port.

7. The valve assembly of claim 1, wherein the flow divider valve comprises a rotor having at least two divider ports and wherein the housing includes a sleeve concentric about the rotor, a first one of the divider ports communicating with a first output port for the first flow path and a second one of the divider ports communicating with a second output port for the second flow path, wherein the rotor is rotatable between angular positions to provide first and second restrictions between the first and second output ports and the divider ports that vary in inverse relation, and wherein the pulsing valve comprises a ported sleeve along the first flow path, rotation of the ported drum causing at least one port block to successively open and close the first flow path.

8. The valve assembly of claim 1, wherein the first flow path and the second paths intersect to form a combined flow passage leading to the outlet.

9. The valve assembly of claim 1, wherein fluid flow along the second path is continuous and uninterrupted during operation of the valve assembly.

10. A valve assembly for pulsing a metered fuel flow for a turbine engine, comprising:
    a valve housing having an inlet adapted to receive the metered flow;
    means for dividing the metered flow into a first flow portion and a second flow portion;
    a first actuator setting a magnitude of a divide between the first and second flow portions;
    means for pulsing the first flow portion;
    a second actuator setting a frequency of the pulsing means;
    passageway means for combining the first and second flow portions for communication to the turbine engine, wherein at least one of the first actuator and the second actuator is electrically controllable.

11. The valve assembly of claim 10, wherein the pulsing means includes a sleeve having at least one chopper port rotatable relative to at least one port block, relative rotation between the sleeve and the port block causing the at least one port block to successively open and close the at least one chopper port, and wherein the second actuator is a rotary actuator facilitating relative rotation between the at least one chopper port and the port block.

12. The valve assembly of claim 11, wherein the at least one chopper port comprises a plurality of chopper ports angularly spaced around the sleeve.

13. The valve assembly of claim 11, wherein the dividing means comprises a variable position valve separate of the sleeve.

14. The valve assembly of claim 10, wherein movement of the first actuator varies the first and second flow portions in inverse relation.

15. The valve assembly of claim 10, wherein the second flow portion is continuous and uninterrupted.

16. The valve assembly of claim 1, wherein the second fluid flow is continuous and uninterrupted during operation of the fuel supply system.

17. The valve assembly of claim 10, wherein the means for dividing the metered flow is a spool valve linearly movable on an axis.

18. The valve assembly of claim 10, wherein the means for dividing the metered flow is a flapper valve.

19. A valve assembly for pulsing a metered fuel flow for a turbine engine, comprising:
    a valve housing having an inlet adapted to receive the metered flow;
    means for dividing the metered flow into a first flow portion and a second flow portion;
    a first actuator setting a magnitude of a divide between the first and second flow portions;
    means for pulsing the first flow portion, said means for pulsing downstream of the means for dividing the metered flow;
    a second actuator setting a frequency of the pulsing means;
    passageway means for combining the first and second flow portions for communication to the turbine engine.

20. The valve assembly of claim 19, wherein fluid flow along the second path is continuous and uninterrupted during operation of the valve assembly.

21. The valve assembly of claim 19, wherein the pulsing means includes a sleeve having at least one chopper port rotatable relative to at least one port block, relative rotation between the sleeve and the port block causing the at least one port block to successively open and close the at least one chopper port, and wherein the second actuator is a rotary actuator facilitating relative rotation between the at least one chopper port and the port block.

22. The valve assembly of claim 19, wherein the at least one chopper port comprises a plurality of chopper ports angularly spaced around the sleeve.

23. The valve assembly of claim 19, wherein the dividing means comprises a variable position valve separate of the sleeve.

24. The valve assembly of claim 19, wherein movement of the first actuator varies the first and second flow portions in inverse relation.

25. The valve assembly of claim 19, wherein the means for dividing the metered flow is a spool valve linearly movable on an axis.

26. The valve assembly of claim 19, wherein the means for dividing the metered flow is a flapper valve.

* * * * *